United States Patent
Obata (10) Patent No.: US 8,865,331 B2
(45) Date of Patent: Oct. 21, 2014

(54) SECONDARY BATTERY ASSEMBLY

(75) Inventor: Hiroyuki Obata, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 13/056,388

(22) PCT Filed: Jun. 16, 2010

(86) PCT No.: PCT/JP2010/060174
§ 371 (c)(1),
(2), (4) Date: Jan. 28, 2011

(87) PCT Pub. No.: WO2011/158341
PCT Pub. Date: Dec. 22, 2011

(65) Prior Publication Data
US 2013/0078491 A1    Mar. 28, 2013

(51) Int. Cl.
| | |
|---|---|
| *H01M 4/00* | (2006.01) |
| *H01M 6/10* | (2006.01) |
| *H01M 10/04* | (2006.01) |
| *H01M 2/18* | (2006.01) |
| *H01M 2/10* | (2006.01) |
| *H01M 10/36* | (2010.01) |
| *H01M 10/0525* | (2010.01) |
| *H01M 10/0587* | (2010.01) |
| *H01M 2/02* | (2006.01) |

(52) U.S. Cl.
CPC .......... *H01M 10/36* (2013.01); *H01M 10/0525* (2013.01); *H01M 10/0468* (2013.01); *H01M 2/18* (2013.01); *H01M 10/0587* (2013.01); *H01M 2/1077* (2013.01); *H01M 2/1061* (2013.01); *H01M 10/0413* (2013.01); *H01M 10/0431* (2013.01); *Y02E 60/12* (2013.01); *H01M 2/0217* (2013.01)

USPC .......................................................... 429/94

(58) Field of Classification Search
None
See application file for complete search history.

(56) References Cited

U.S. PATENT DOCUMENTS

| | | | |
|---|---|---|---|
| 8,268,472 B2 * | 9/2012 | Ronning et al. | ............. 429/120 |
| 2006/0202661 A1 | 9/2006 | Kim et al. | |
| 2008/0241646 A1 * | 10/2008 | Sawa et al. | ...................... 429/94 |
| 2009/0111010 A1 | 4/2009 | Okada et al. | |
| 2011/0117423 A1 * | 5/2011 | Kim | ............................. 429/176 |

FOREIGN PATENT DOCUMENTS

| | | |
|---|---|---|
| JP | 2000-200592 | 7/2000 |
| JP | 2003-323874 | 11/2003 |
| JP | 2003-331932 | 11/2003 |
| JP | 2005-116458 | 4/2005 |

(Continued)

*Primary Examiner* — Ula C Ruddock
*Assistant Examiner* — Lisa S Park Gehrke
(74) *Attorney, Agent, or Firm* — Finnegan, Henderson, Farabow, Garrett & Dunner, LLP (57) ABSTRACT

A secondary battery assembly of the present invention comprises: a secondary battery including a wound electrode body enclosed in a flat rectangular case; a contact member partly contacting a side surface having a maximum area (pressed surface) of outer surfaces of the battery; and a binding member for binding the battery and the contact member, the binding member binding the contact member to partly press against the pressed surface. The contact member includes: a plurality of contact parts arranged discretely, each contact part being in contact with the pressed surface; and a connecting part connecting the contact parts. The contact parts are protruding from the connecting part toward the pressed surface, and to press more strongly both one-side regions of the pressed surface corresponding to portions off the center of the wound body in the winding axis direction, and to press less strongly a central region between the one-side regions.

11 Claims, 10 Drawing Sheets

(56) References Cited

FOREIGN PATENT DOCUMENTS

| | | |
|---|---|---|
| JP | 2005-259500 | 9/2005 |
| JP | 2006-253144 | 9/2006 |
| JP | 2007-258160 | 10/2007 |
| JP | 2008-135289 | 6/2008 |
| JP | 2008-186591 | 8/2008 |
| JP | 2008-293771 | 12/2008 |
| JP | 2009-48965 | 3/2009 |
| JP | 2009-110833 | 5/2009 |
| JP | 2009-259455 | 11/2009 |
| JP | 2009259455 A * | 11/2009 |
| JP | 2010-97693 | 4/2010 |

* cited by examiner

SECONDARY BATTERY ASSEMBLY

CROSS-REFERENCE TO RELATED APPLICATIONS

This is a national phase application filed under 35 U.S.C. 371 of PCT/JP2010/060174 filed on Jun. 16, 2010, the entire contents of which are incorporated herein by reference.

TECHNICAL FIELD

The present invention relates to a secondary battery assembly including a secondary battery containing a wound electrode body in a rectangular flat case. More particularly, the present invention relates to a secondary battery assembly in which secondary batteries are bound so as to be partly pressed at a side surface having a maximum area (hereinafter, referred to as a pressed surface) of outer surfaces of each secondary battery.

BACKGROUND ART

There is a secondary battery configured in such a manner that positive and negative electrode plates are wound or laminated with a separator interposed therebetween and they are enclosed together with an electrolyte solution in an outer case. It is known that gas occurs in such a secondary battery due to repeated charge and discharge, causing variations in internal pressure, deformation of the outer case, and others. This deformation is undesired because they cause rapid deterioration of the secondary battery. For avoiding such deformation, a flat-shaped secondary battery is particularly arranged such that binding plates or the like are placed in contact with pressed surfaces of an outer case, pressing against the pressed surfaces, to prevent deformation of the case. Further, also used is a battery pack in which a plurality of secondary batteries are arranged and externally entirely bound with binding plates.

For instance, Patent Literature 1 discloses a battery pack in which flat type secondary batteries stacked one on another are entirely narrowed by binding plates and tightened with a belt. It is disclosed that this configuration can bear down active materials applied on an electrode plate, thereby preventing separation of the active materials from the electrode plate. Another battery pack is also disclosed (see Patent Literature 2, for example) in which binding plates are placed one each between stacked secondary batteries and connected to each other to give surface pressure on each secondary battery. Any battery packs mentioned above are adapted to maintain the planarity of a side surface of the secondary battery to uniformize the surface pressure.

CITATION LIST

Patent Literature

Patent Literature 1: JP 2003-323874A
Patent Literature 2: JP 2005-259500A

SUMMARY OF INVENTION

Technical Problem

However, many of secondary batteries to be mounted in a vehicle or the like are used by repeating large-current charge and discharge (referred to as a high rate). By this usage manner, particularly in a secondary battery including a wound electrode body, the internal pressure is apt to be higher in a central portion in a winding axis direction than in a portion off the central portion. Accordingly, when such a binding method as to keep the flat shape of the outer case is selected as in the aforementioned conventional battery pack, the central portion of the surface is subjected to higher surface pressure than the portions located on both sides thereof. In other words, this binding method could not always provide uniform surface pressure. In the case where the secondary batteries to be used at the high rate are bound to keep respective flat shape, a problem occurs that the surface pressure cannot be maintained uniform.

The present invention has been made to solve the above problems and has a purpose to provide a secondary battery assembly capable of maintaining uniform surface pressure of a secondary battery to be used at a high rate and restraining deterioration of the secondary battery from progressing.

Solution to Problem

To achieve the above purpose, one aspect of the invention provides a secondary battery assembly comprising: a secondary battery including a wound electrode body enclosed in a flat rectangular case; a contact member partly contacting a side surface having a maximum area (hereinafter, referred to as "pressed surface") of outer surfaces of the secondary battery; and a binding member for binding the secondary battery and the contact member, the binding member being configured to bind the contact member to partly press against the pressed surface, wherein the contact member includes: a plurality of contact parts arranged discretely, each contact part being in contact with the pressed surface; and a connecting part connecting the plurality of contact parts to one another, the contact parts are formed to protrude from the connecting part toward the pressed surface, and into an arrangement or a shape to press more strongly both one-side regions of the pressed surface corresponding to portions off the center of the wound electrode body in the winding axis direction, and to press less strongly a central region of the pressed surface between the one-side regions, the central region corresponding to a portion close to the center of the wound electrode body in the winding axis direction.

In the secondary battery assembly in the above aspect, the pressed surface of the secondary battery is partly pressured by the contact member. The contact member is configured by connecting a plurality of discretely provided contact parts by a connecting portion. Accordingly, the position of each contact part with the secondary battery comes to a previously determined one. Further, the position of each contact part and the protruding height thereof are appropriately set in advance, so that the pressing strength to the pressed surface at that place can be set. Herein, the shape or place of the contact part is selected so that the pressing force to the pressed surface is higher for each one-side region than for the central region. Accordingly, the internal pressure of the secondary battery can be made uniform. Even the secondary battery to be used at a high rate can keep the surface pressure uniform, thereby preventing the deterioration of the secondary battery from progressing.

In the above aspect of the invention, preferably, the contact part for the one-side region has a protruding height larger than a protruding height of the contact part for the central region.

The above configuration can provide a stronger pressing force to the pressed surface for each one-side region than for the central region.

Alternatively, in the above aspect of the invention, it may be arranged such that the contact part for the one-side region has an area occupying ratio higher than an area occupying ratio of the contact part for the central region.

Such a configuration also can provide a stronger pressing force to the pressed surface for each one-side region than for the central region.

Further, in the above aspect of the invention, preferably, the contact parts include a contact part formed to extend continuously in a winding axis direction of the wound electrode body over the one-side regions located on both sides.

The above shape is suitable for the secondary battery assembly arranged to flow cooling air in the winding axis direction.

Further, in the above aspect of the invention, preferably, the contact parts include contact parts formed in correspondence to only each one-side region and no contact part formed in correspondence to the central region between the one-side regions.

Alternatively, in the above aspect of the invention, it may be arranged such that the contact parts include a contact part formed such that a thickness in a direction perpendicular to the winding axis direction of the wound electrode body is thicker for the one-side regions than for the central region.

Alternatively, in the above aspect of the invention, it may be arranged such that the contact parts include a contact part formed to extend in a direction perpendicular to the winding axis direction of the wound electrode body.

Such a shape also can adjust the pressing force to the pressed surface. In particular, it is suitable to flow cooling air in a direction perpendicular to the winding axis direction.

Further, in the above aspect of the invention, preferably, the contact part located for each one-side region is formed to be longer than the contact part located for the central region Alternatively, in the above aspect of the invention, the contact parts located for the one-side regions are arranged at narrower intervals than the contact parts located for the central region.

Alternatively, in the above aspect of the invention, it may be arranged such that the contact parts include a contact part protruding in a columnar shape.

Such a shape can provide a secondary battery assembly in which the pressing force to each pressed surface is adjusted.

Further, in the above aspect of the invention, preferably, a contact area of each contact part to the pressed surface is larger for the one-side region than for the central region.

Alternatively, in the above aspect of the invention, it may be arranged such that the contact parts located for the one-side regions are arranged at narrower intervals than the contact parts located for the central region.

Advantageous Effects of Invention

According to the secondary battery assembly in the above configurations, the surface pressure of the secondary battery to be used at a high rate can be kept uniform, thereby restraining the deterioration of the secondary battery from progressing.

DESCRIPTION OF EMBODIMENTS

A detailed description of a preferred embodiment of the present invention will now be given referring to the accompanying drawings. This embodiment embodies the invention as a battery pack in which a plurality of lithium ion secondary batteries are stacked one on another and connected to each other.

Figure 1:
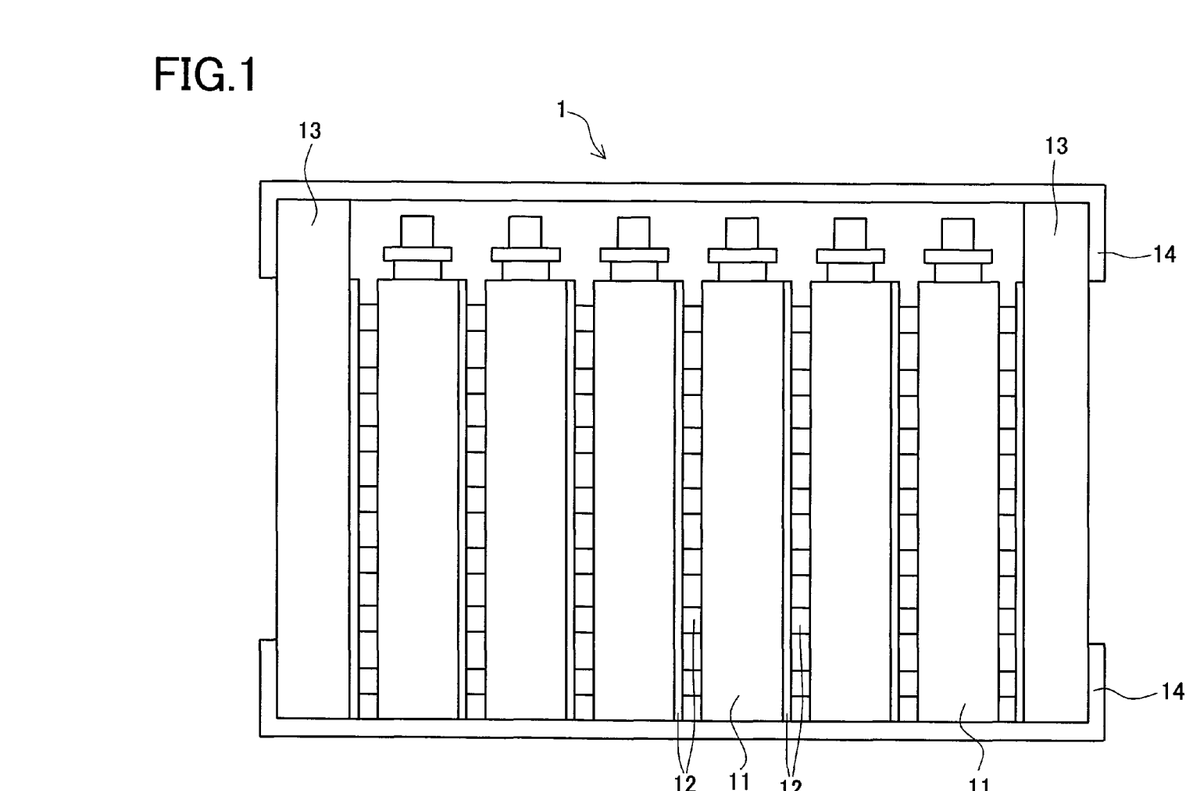
FIG. 1 is a side view of a battery pack in an embodiment.

A battery pack 1 in this embodiment includes a plurality of cells 11, a plurality of contact members 12, and two binding members 13, as shown in FIG. 1. The cells 11 and the contact members 12 are alternately placed in a stacking manner. The binding members 13 are placed on both sides of the whole assembly. The binding members 13 on both sides are locked to each other in such a manner that both ends of each binding band 14 are fixed to the binding members 13. Thus, the cells 11 and others located between them are pressed from both sides by the binding members 13. In this embodiment, this battery pack 1 corresponds to a secondary battery assembly.

Figure 2:
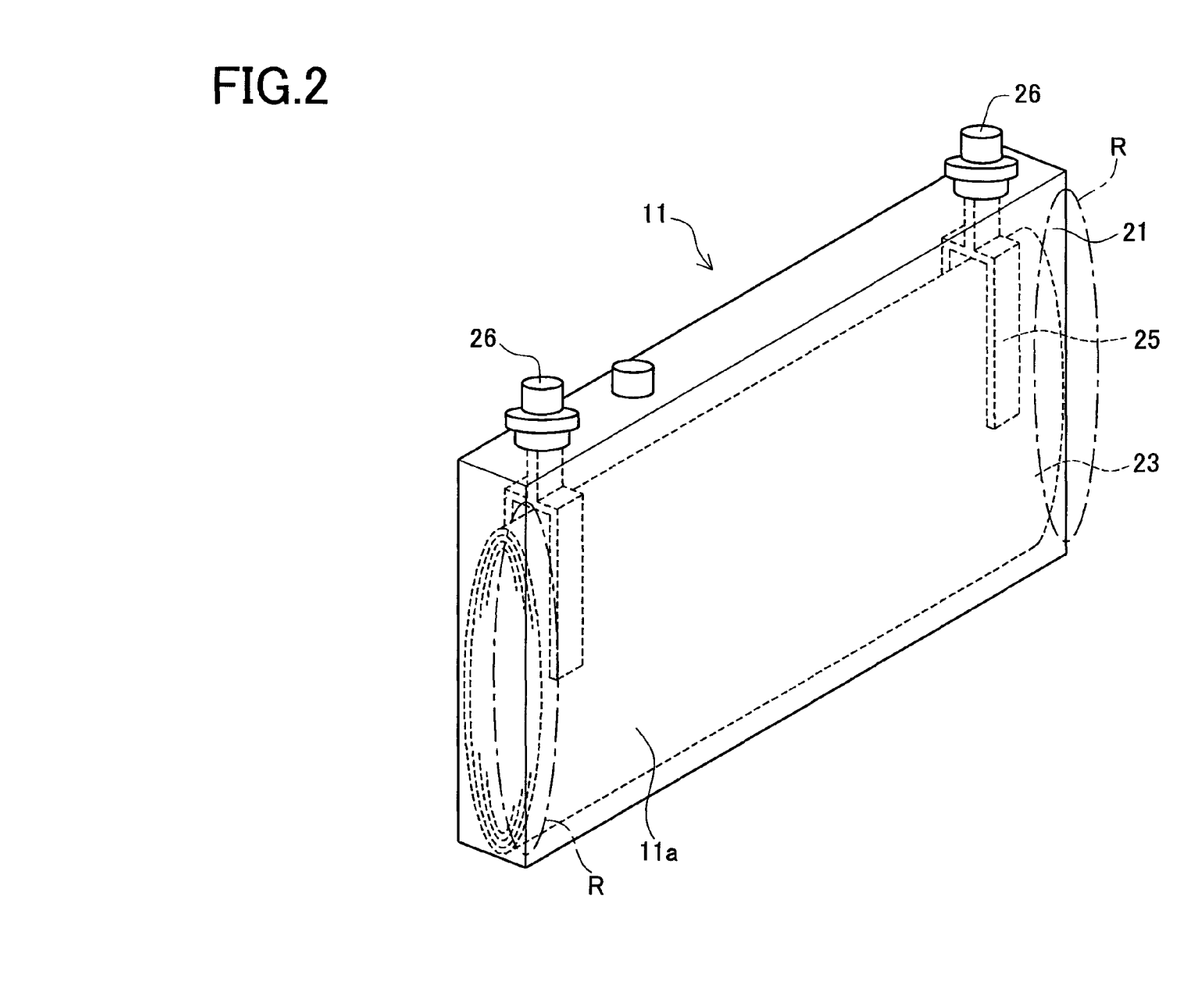
FIG. 2 is an explanatory view showing the inside of a cell in the embodiment.

Each cell 11 in this embodiment is a wound type lithium ion secondary battery in which a wound electrode body 23 is enclosed with an electrolyte in a rectangular flat case 21 as shown in FIG. 2. The electrode body 23 in this embodiment is of a flat shape deformed in a perpendicular direction to a winding axis. The electrode body 23 is connected, at both ends of the winding axis, to positive and negative electrode terminals 25 respectively. The electrode terminals 25 are connected individually to external terminals 26 each protruding from an upper surface of the case 21 in the figure. Of the cell 11, a right front surface and its back surface, or a left rear surface, in the figure are pressed surfaces 11a having a larger area than other surfaces.

Figure 3:
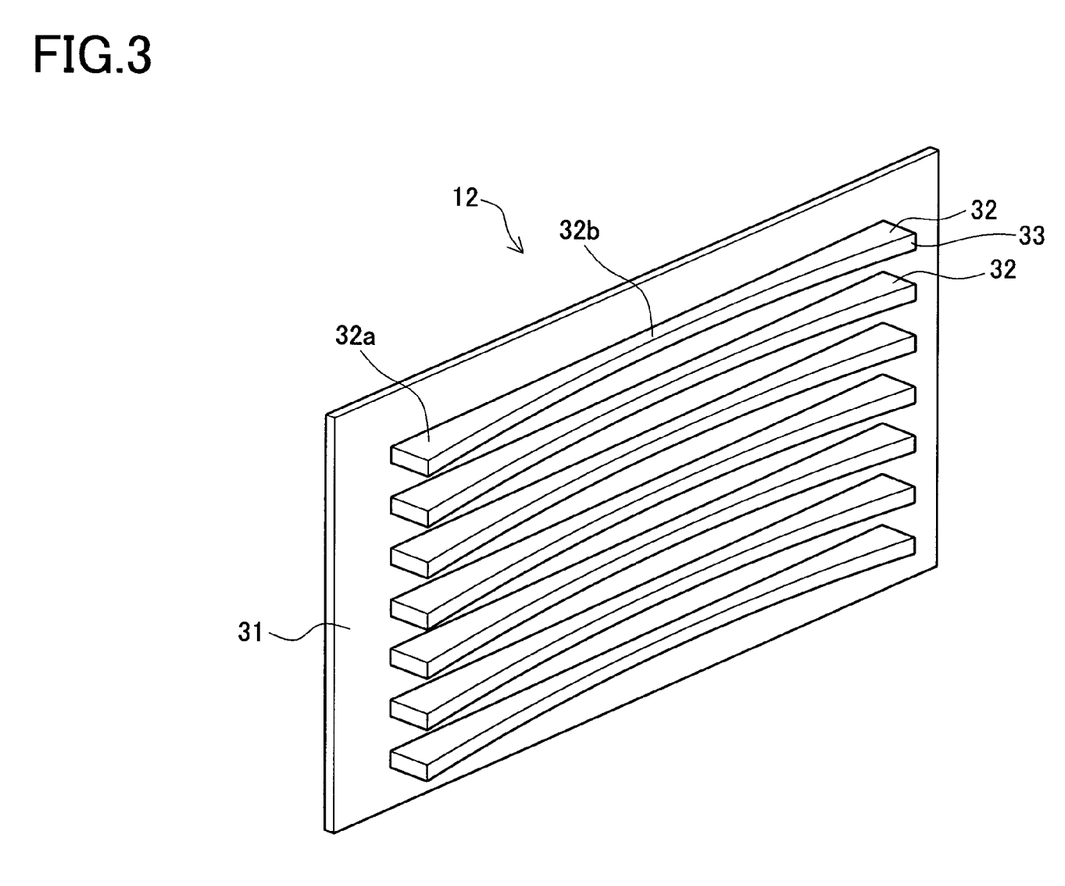
FIG. 3 is a perspective view of a contact member.

The contact members 12 in this embodiment are placed between the cells 11 as shown in FIG. 1 and also located between the cell 11 and the binding member 13. Each contact member 12 has a plate-like connecting part 31 and comb-tooth parts 32 formed to protrude right forward from the connecting part 31 in the figure as shown in FIG. 3. In this embodiment, the comb-tooth parts 32 are formed on only one surface of the connecting part 31 and in parallel with each other. Each comb-tooth part 32 of the contact member 12 in this embodiment has a top face 33 having a gentle curve as shown in FIG. 3. In other words, when this contact member 12 is viewed from above in FIG. 3, the top face 33 of the comb-tooth part 32 is curved to be concave at the center thereof a shown in FIG. 4.

In the battery pack 1 in this embodiment, each contact members 12 is placed so that the comb-tooth parts 32 are parallel with the winding axis of the electrode body 23 of the cell 11. In other words, the contact members 12 each oriented as shown in FIG. 3 are held one between the cells 11 each oriented as shown in FIG. 2. As a result, the top face 33 of each comb-tooth part 32 of the contact member 12 contacts with the pressed surface 11a of the cell 11. Each comb-tooth part 32 having the curved top face 33 as mentioned above is not uniform in protruding height. In the battery pack 1, therefore, pressing force of the contact member 12 to the pressed surface 11a is different according to portions of that surface.

Figure 4:
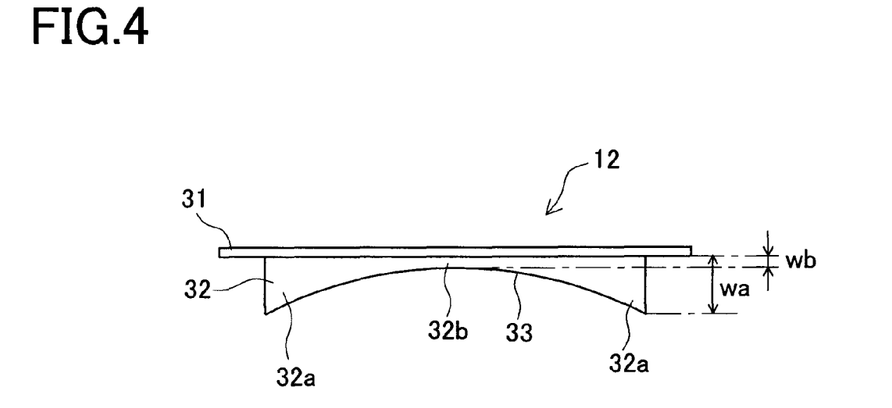
FIG. 4 is a side view showing a comb-tooth shape of the contact member.

To be concrete, the contact member 12 is designed to have one-side portions 32a located on both sides each having a large protruding height wa from the connecting part 31 and a central portion 32b having a small protruding height wb as shown in FIG. 4. In the battery pack 1, therefore, the one-side portions 32a of the contact member 12 press against the pressed surface 11a more strongly than the central portion 32b does. Accordingly, the pressed surface 11a of each cell 11 receives a larger pressing force at one-side regions 41 (see FIG. 5) corresponding to portions off the center in the winding axis direction than at a central region 42 corresponding to a portion close to the center. It is found that this pressing can uniformize the surface pressure on the cell 11.

In FIG. 5 and FIGS. 6 to 8 showing experimental results mentioned later, the central region 42 and each one-side region 41 are illustrated as being spaced at intervals from each other. However, it is not always necessary to provide such spacing in setting the central region 42 and the one-side regions 44. These central region 42 and one-side regions 44 may be set to be adjoining with each other. Further, the right and left one-side regions 41 in the figure are not always required to be equal in area size and shape and magnitude of the pressing force.

Figure 5:
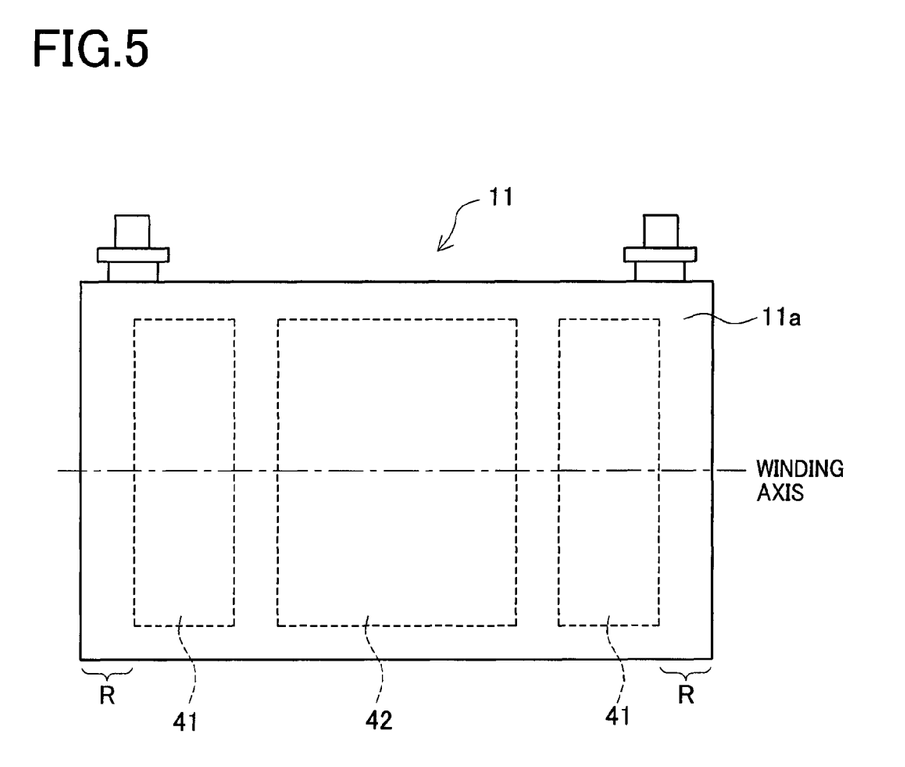
FIG. 5 is an explanatory view showing a distribution of pressing pressure to a cell.

On the other hand, a slight clearance exists between each one-side region 41 and the outer periphery of the pressed surface 11a. This results from that the case 21 in this embodiment is a metal container having an almost rectangular parallelepiped shape. In other words, a metal plate is bent at an almost right angle to form an end portion R (see FIG. 2) at an intersection of surfaces of the case 21. Each end portion R of the case 21 is remarkably high in rigidity and does not need to be pressed by the contact member 12. In the present embodiment, therefore, the position of each component is determined so that the comb-tooth parts 32 do not contact with the end portions R. As shown in FIG. 5, the end portions R are located close to both ends in the winding axis direction than the one-side region 41 is. The end portions R are not included in the one-side regions 41.

The connecting part 31 of the contact member 12 has a size almost equal to the pressed surface 11a. The connecting part 31 is formed, on its surface, with the comb-tooth parts 32 in a range corresponding to a range including the one-side regions 41 on both sides and the central region 42 but not including the end portions R. For instance, as shown in FIG. 3, this range is the inside excepting a portion near the outer periphery of the connecting part 31. In using the battery pack 1, it is preferable to make cooling air flow in a direction parallel to the comb-tooth parts 32 to thereby prevent overheating of the cell 11.

The present inventors firstly conducted a cycle test mentioned below to ascertain a changing situation of the internal pressure in the conventional cell 11. The inventors measured an increasing rate of internal resistance value caused by the progress of endurance and checked changes in distribution of the internal pressure. This cycle test was conducted under the following test conditions. A rectangular-wave pulse cycle was performed by discharge of 24 C for 10 seconds and charge of 2 C for 120 seconds in an environment of 25° C. An internal resistance value of the battery was calculated from a voltage drop at the time 10 seconds after the beginning of the discharge in each cycle.

Figure 6:
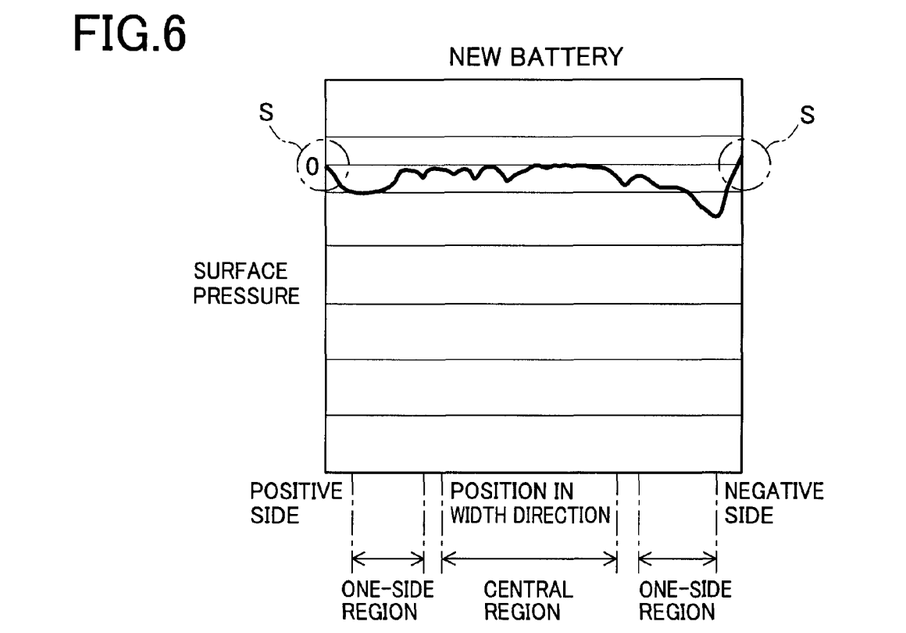
FIG. 6 is a graph showing a distribution of surface pressure in an initial condition of a new battery.
Figure 7:
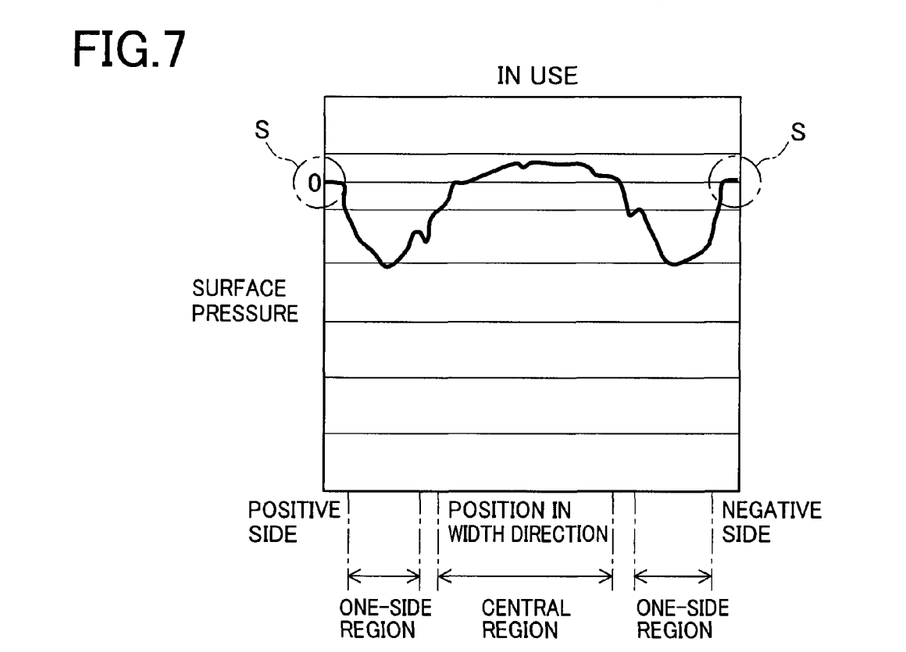
FIG. 7 is a graph showing a distribution of surface pressure in the process of use.
Figure 8:
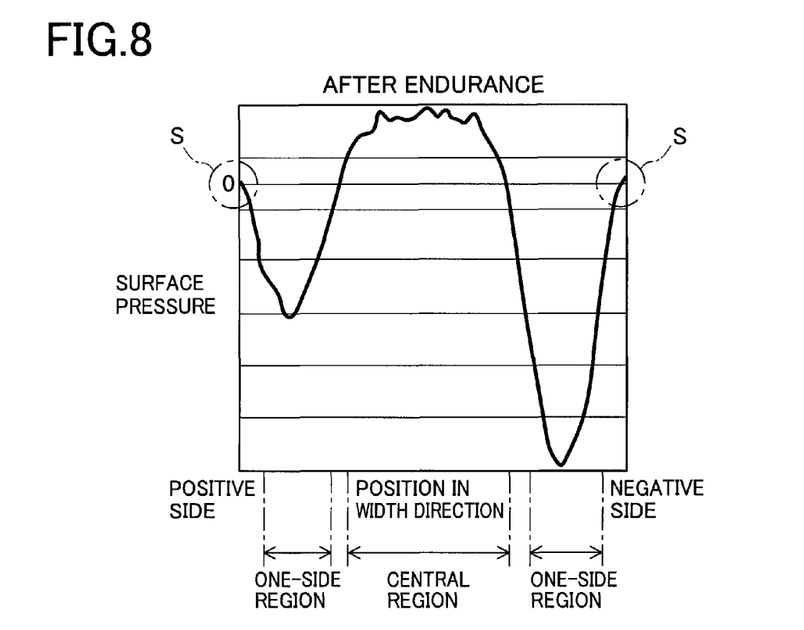
FIG. 8 is a graph showing a distribution of surface pressure after endurance use.
Figure 9:
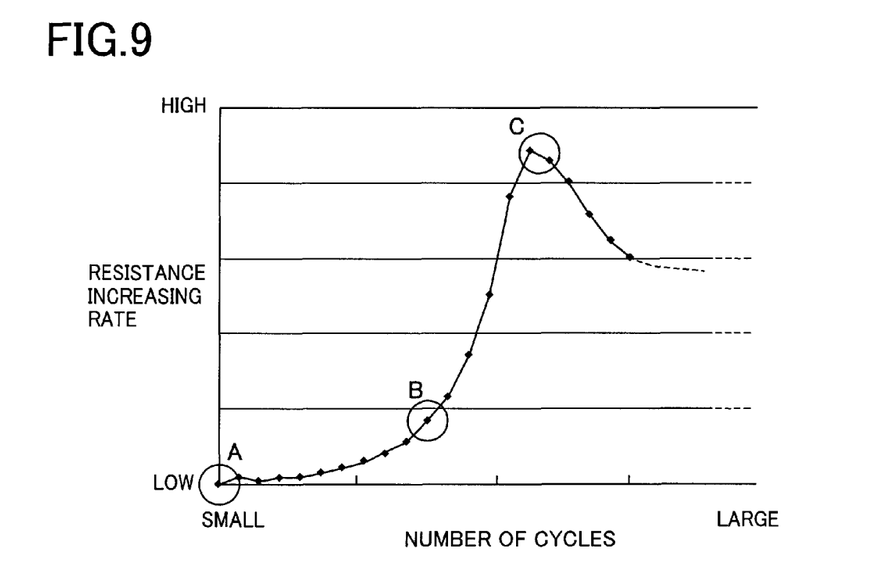
FIG. 9 is a graph showing variations in internal resistance value in a cycle test.

FIG. 9 is a graph showing a relationship between the increasing rate of internal resistance value of the battery and the number of cycles in the cycle test. In this graph, the horizontal axis indicates the number of cycles and the vertical axis indicates the increasing rate of internal resistance value from an initial condition of a new battery. In FIG. 9, marks A, B, and C represent time points at which a distribution of surface pressure was measured. Results of this measurement are shown in FIGS. 6 to 8. Herein, the surface pressure on the pressed surface 11a of the cell 11 at a point near the center in a vertical direction in FIG. 1 was measured along the winding axis over the entire range of the pressed surface 11a.

The transition of variation range of the surface pressure has almost the same tendency as the transition of magnitude of the internal resistance value of the battery. When the internal resistance value shows a peak, the variation range of the surface pressure also shows a peak. From this fact, it could be confirmed that a constant correlation exists between the surface pressure distribution and the increasing rate of the internal resistance value of the cell 11. The cell 11 at the time point C has considerably progressed in endurance use but is still usable.

In FIGS. 6 to 8, a middle range in the horizontal axis corresponds to the central region 42 in FIG. 5. As shown in those figures, the surface pressure of the range corresponding to the central region 42 gradually increased as the endurance use progresses. Further, as the surface pressure on the central region 42 increases, the surface pressure on the one-side regions 41 on both sides gradually becomes large negative. In other words, a difference between the surface pressure on the central region 42 and the surface pressure on each one-side region 41 is not substantially found in a new battery but increases as the endurance use progresses.

In the cell 11 having progressed in endurance use, a large positive pressure was exerted on the central region 42 and a large negative pressure was exerted on the one-side regions 41. However, the distributions of surface pressure on the one-side regions 41 were not symmetric between a positive electrode side and a negative electrode side. The surface pressure on the negative electrode side has a remarkably larger difference from that on the central region 42 than the surface pressure on the positive electrode side has. Even if the internal pressure changes, it will not appear as the surface pressure on each end portion R (see FIG. 2). In each graph in FIGS. 6 to 8, therefore, measurement values in end portions S which are ranges corresponding to the end portions R on the positive electrode side and the negative electrode side are approximate zero.

From the above measurement result, it is found that variation in surface pressure gradually increases as charge and discharge are repeated from the initial condition of a new battery. Specifically, when each cell 11 is bound so as to keep its flat shape as in a conventional one, the surface pressure is not maintained to be uniform. On the other hand, it is known that, in such a secondary battery as in the present embodiment, salt concentration becomes uneven within a surface of the electrode as the endurance use progresses. In general, the salt concentration becomes high in a portion close to the positive terminal and low in a central portion. Further, the salt concentration in a portion close to the negative terminal is often at an intermediate level between them. This unevenness of salt concentration also contributes to a rise in internal resistance value of the cell 11. The present inventors focused attention on the unevenness of salt concentration and the surface pressure were distributed in similar patterns.

The present inventors thus found out that the variation in surface pressure could be restrained by using the contact members 12 of the present embodiment, not keeping the flat shape. As shown in FIG. 3, the comb-tooth part 32 is designed smaller in the central portion 32b than in the one-side region 32a, so that the comb-tooth part 32 presses the pressed surface 11a of the cell 11 with a smaller pressing force on the central region 42 than on the one-side regions 41. This could prevent variation in surface pressure after endurance use, and restrain the progress of unevenness of salt concentration and the increase in internal resistance value. In other words, it is possible to delay the internal resistance value reaching a peak as if the result in FIG. 9 is expanded laterally.

In the present embodiment, the shape of each comb-tooth part 32 of the contact member 12 is designed as shown in FIGS. 3 and 4 in order to provide different pressing forces according to regions of the pressed surface 11a of the cell 11. That is, each comb-tooth part 32 is shaped so that the top face 33 is concave in the center. The top face 33 of each comb-tooth part 32 may be formed to have for example a reversed shape of the shape of surface pressure distributions shown in FIGS. 7 and 8. Such a shape can particularly contribute to efficient uniformization of the surface pressure at that stage.

The above explanation shows that each comb-tooth part 32 is shaped as shown in FIGS. 3 and 4 to make the pressing force on the central region 42 smaller than the pressing force on the one-side regions 41, but the shape of the contact member 12 is not limited to the above. The contact member 12 has only to have a protruding height lower for the central region 42 than for each one-side region 41. As another alternative, the contact member 12 may be designed to have a contact area to the pressed surface 11a at different area occupying ratios between the one-side regions 41 and the central region 42, thereby reducing the surface pressure distribution. In other words, the area occupying ratio to the central region 42 is made lower than the area occupying ratio to each one-side region 41.

Figure 10:
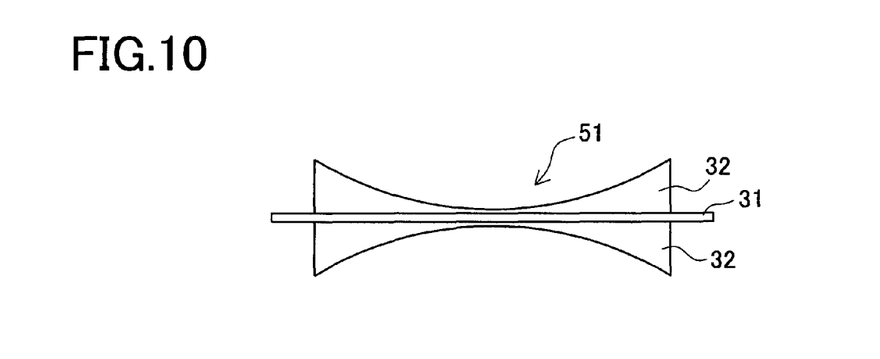
FIG. 10 is a side view showing another example of a comb-tooth shape of a contact member.

The following explanation is given to examples of other shapes of the comb-tooth part. For instance, a contact member 51 to be located between the cells 11 may be formed to have comb-tooth parts 32 on both surfaces of a connecting part 31 as shown in FIG. 10. It is however preferable that a contact member to be placed between a binding member 13 and a cell 11 has comb-tooth parts on only one surface and is disposed with its flat surface being in contact with the binding member 13. Also in this case, the shape of each comb-tooth part may be appropriately changed by selecting from the following alternatives.

Figure 11:
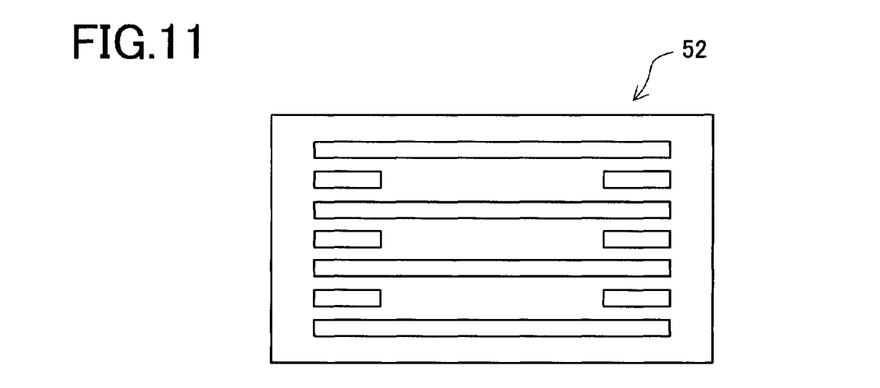
FIG. 11 is a front view showing another example of arrangement of comb teeth of a contact member.
Figure 12:
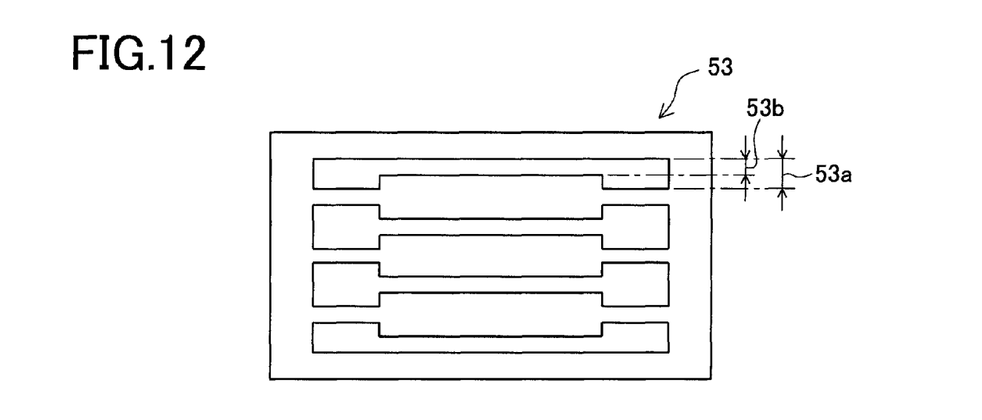
FIG. 12 is a front view showing another example of arrangement of comb teeth of a contact member.

Comb-teeth extending in the winding axis direction may be configured for example like a contact member 52 shown in FIG. 11 and a contact member 53 shown in FIG. 12. The contact member 52 is configured so that short comb-teeth for only the one-side portions 32a are added between long comb-teeth. In a part for the central portion 32b, no comb-teeth are provided between the short comb-teeth. The contact member 53 is designed such that each comb-tooth has a top face having a larger width 53a for each one-side region 41 than a width 53b for the central region 42. This top face has a stepped shape in the figure but may have a smoothly changing shape.

Figure 13:
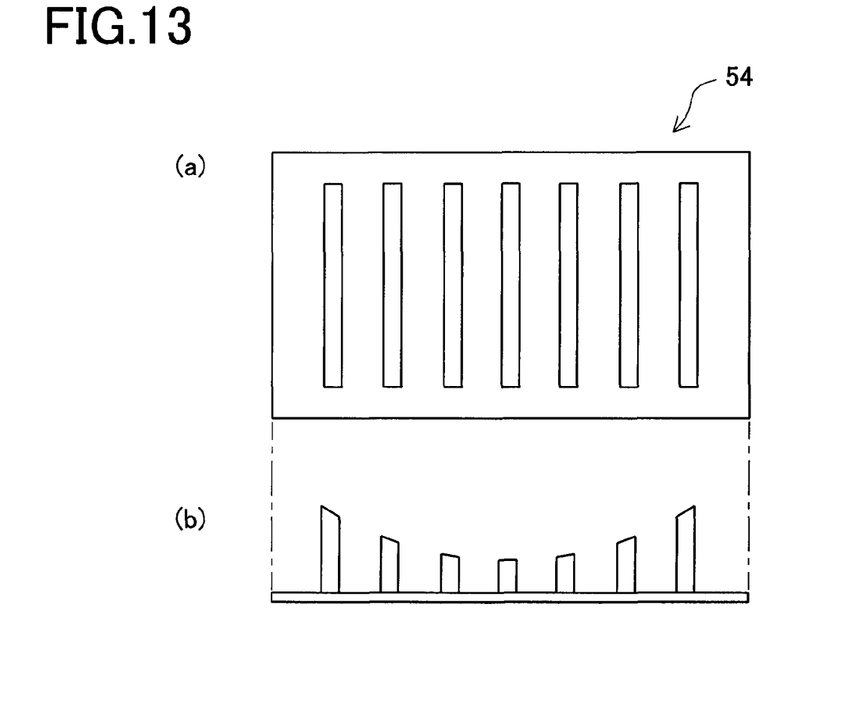
FIG. 13 is a front view (a) and a side view (b) showing another example of arrangement of comb teeth of a contact member.
Figure 14:
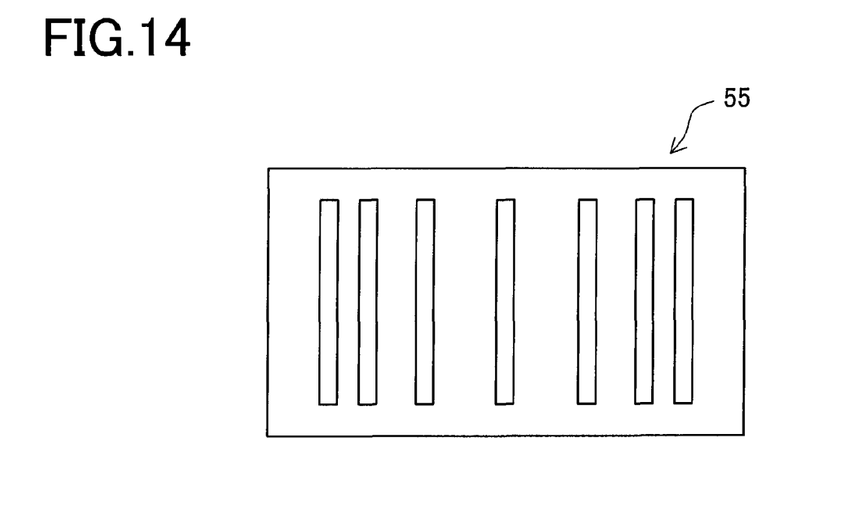
FIG. 14 is a front view showing another example of arrangement of comb teeth of a contact member.
Figure 15:
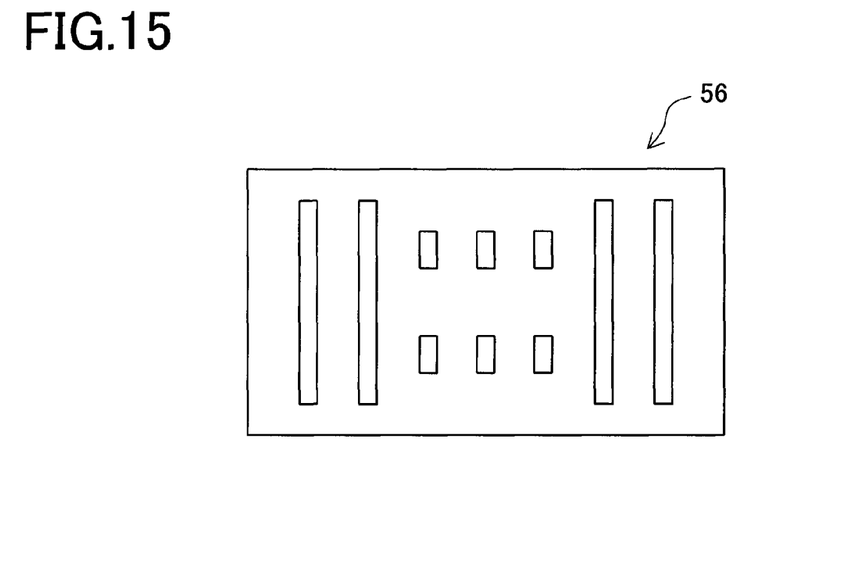
FIG. 15 is a front view showing another example of arrangement of comb teeth of a contact member.

Alternatively, as shown in FIGS. 13 to 15, the comb-teeth may be arranged in a direction perpendicular to the winding axis direction (a vertical direction in the figures) of the cell 11. They suit for the case where cooling air is caused to flow in the vertical direction in the figures. Each comb-tooth may be oriented along the direction of the cooling air. For instance, in a contact member 54 shown in FIG. 13, as shown in a side view therein, the comb-teeth have different protruding heights according to places in a lateral direction in the figure, that is, in the winding axis direction.

As shown as a contact member 55 in FIG. 14, comb-teeth may be arranged at different pitches to provide different area occupying ratios. Alternatively, as shown as a contact member 56 in FIG. 15, comb-teeth may be different in length between ones for the central region 41 and the others for the one-side regions 41. In this figure, two short comb-teeth are arranged vertically for the central region 42. As alternatives, a single comb-tooth or three or more comb-teeth may be arranged.

Figure 16:
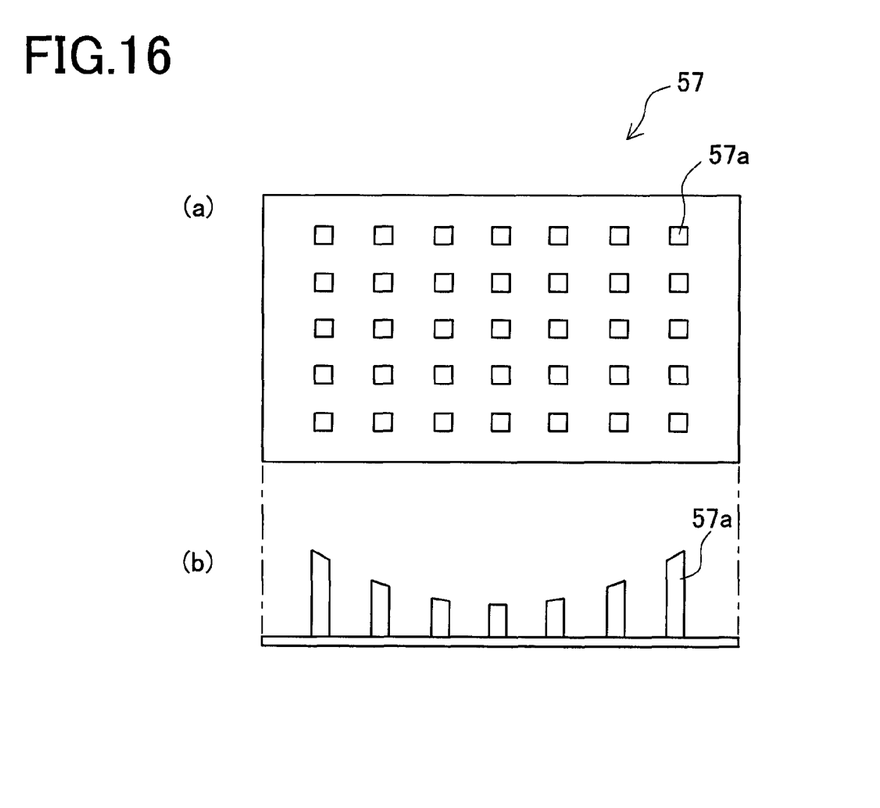
FIG. 16 is a front view (a) and a side view (b) showing another example of arrangement of comb teeth of a contact member.
Figure 17:
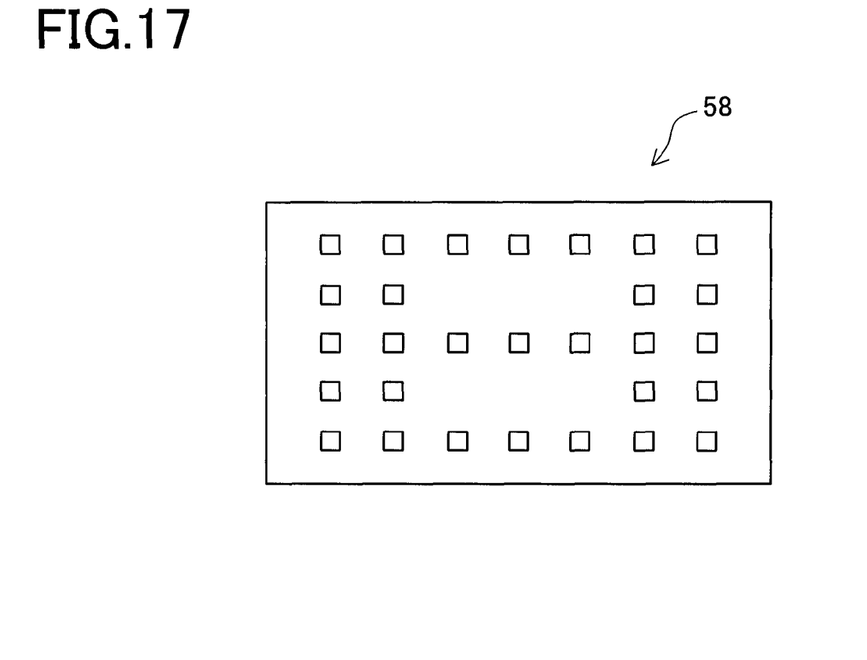
FIG. 17 is a front view showing t another example of arrangement of comb teeth of a contact member.
Figure 18:
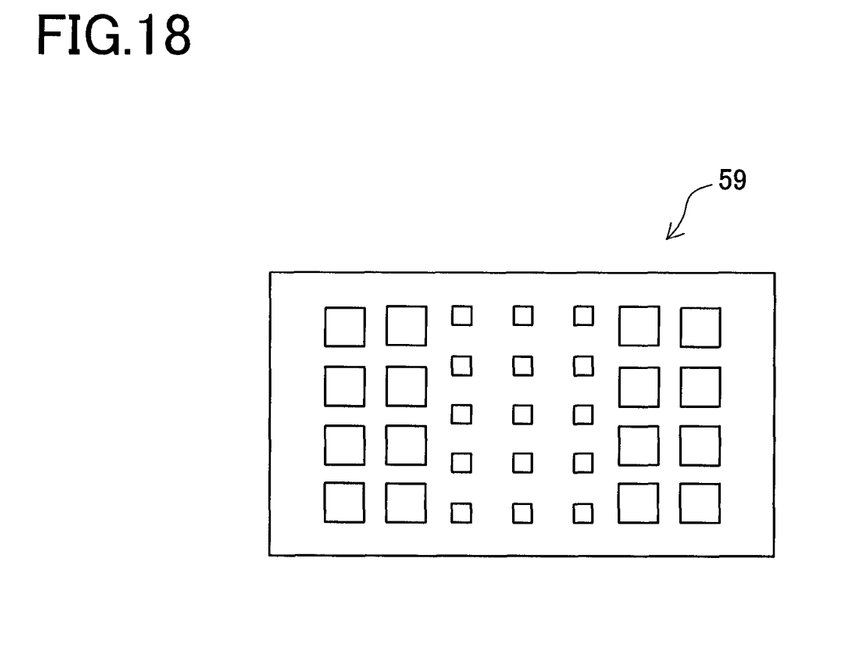
FIG. 18 is a front view showing another example of arrangement of comb teeth of a contact member.

Furthermore, as shown in FIGS. 16 to 18, a contact member may be formed with columnar-like protrusions. For instance, as shown in FIG. 16, a contact member 57 is formed with protrusions 57a having the same thickness, which are arranged in a matrix. The contact member configured in this way can be used irrespective of the flow direction of cooling air. In this case, as shown in a side view in the figure, the protrusions 57a may also have different protruding heights according to places in the winding axis direction. Specifically, shorter ones are arranged for the central region 42 and longer ones are arranged for the one-side regions 41.

As another alternative, as shown as a contact member 58 in FIG. 17, the protrusions may be arranged sparsely for the central region 42 and arranged closely for the one-side regions 41. Alternatively, as shown in FIG. 18, a contact member 59 provided with protrusions different in thickness may be adopted. This configuration including the thin protrusions for the central region 42 and the thick protrusions for the one-side regions 41 may also provide different occupying ratios of the protrusions according to the regions.

According to the battery pack 1 in the present embodiment explained in detail above, the contact member 12 is placed in contact with the pressed surface 11a of the cell 11. The contact member 12 includes the comb-tooth parts 32 on the side facing to the pressed surface 11a. The comb-tooth parts 32 are protrusions each extending along the winding axis direction of the cell 11 and having different protruding heights according to portions. Specifically, the protruding height of each comb-tooth part 32 for the central region 42 in the winding axis direction is shorter than the protruding height for the one-side regions 41. It is therefore possible to restrain concentration of the surface pressure on the central region, uniformizing the surface pressure, and prevent an increase in internal resistance value. This can prevent the deterioration of the cell 11 from progressing.

The above embodiment is a mere example and imposes no limit to the present invention. The present invention therefore may be embodied in other specific forms without departing from the essential characteristics thereof.

For instance, the above embodiment exemplifies the battery pack including a plurality of the cells 11 stacked one on another but does not always need more than one cell. The present invention may be applied to a secondary battery assembly configured that a single cell 11 is held from both sides by contact members 12.

Furthermore, it may be arranged that a surface of the connecting part 31 having no comb-tooth part is formed with protrusions having such a height as to contact with the end portions of the case 21 of the cell 11, thereby forming a clearance between the contact member 12 and the cell 11. Alternatively, the connecting part 31 may be formed with a through hole in a place other than the comb-tooth part. These configurations allow the cell 11 located on a rear side of the comb-tooth part to be exposed to cooling air through the clearance or the through hole.

The present invention is widely applicable not only to the lithium ion secondary battery but also to a nonaqueous electrolyte type secondary battery. The present invention also may be applied not only to the can case but also to a battery using a laminated case as long as it is pressed in use.

REFERENCE SIGNS LIST

1 Battery pack
11 Cell
11a Pressed surface
12, 51, 52, 53, 54, 55, 56, 57, 58, 59 Contact member
13 Binding member
21 Case
23 Electrode body
31 Connecting part
32 Tooth part
41 One-side region
42 Central region

The invention claimed is:

1. A secondary battery assembly comprising:
a secondary battery including a wound electrode body having a flat shape enclosed in a flat rectangular case;
a contact member partly contacting a side surface of the secondary battery as a pressed surface, the side surface having a maximum area of outer surfaces of the secondary battery; and
a binding member for binding the secondary battery and the contact member, the binding member being configured to bind the contact member to partly press against the pressed surface,
wherein the pressed surface includes both one-side regions corresponding to portions off the center of the wound electrode body in the winding axis direction and a central region between the one-side regions, the central region corresponding to a portion close to the center of the wound electrode body in the winding axis direction,
wherein the contact member includes:
a plurality of contact parts arranged discretely in positions corresponding to both of the one-side regions and the central region of the pressed surface, each contact part being in contact with the pressed surface; and
a connecting part connecting the plurality of contact parts to one another,
the contact parts are formed to protrude from the connecting part toward the pressed surface, and into an arrangement or a shape to press more strongly both of the one-side regions of the pressed surface and to press less strongly the central region of the pressed surface,
wherein a protruding height of the contact parts is larger in a position corresponding to the one-side regions than in a position corresponding to the central region,
wherein the pressed surface includes an outward deformation in the central region, and
wherein the contact parts conform to the pressed surface including an outward deformation in the central region.

2. The secondary battery assembly according to claim 1, wherein the contact parts include a contact part formed to extend continuously in the winding axis direction of the wound electrode body and in contact over the one-side regions located on both sides.

3. The secondary battery assembly according to claim 2, wherein the contact parts further include contact parts formed in correspondence to only each one-side region without being formed in correspondence to the central region between the one-side regions.

4. The secondary battery assembly according to claim 2, wherein the contact parts include a contact part formed such that a thickness in a direction perpendicular to the winding axis direction of the wound electrode body is thicker in the position corresponding to the one-side regions than in the position corresponding to the central region.

5. The secondary battery assembly according to claim 1, wherein the contact parts include a contact part formed to extend in a direction perpendicular to the winding axis direction of the wound electrode body.

6. The secondary battery assembly according to claim 5, wherein the contact part located corresponding to each one-side region is formed to be longer than the contact part located corresponding to the central region.

7. The secondary battery assembly according to claim 5, wherein the contact parts located corresponding to the one-side regions are arranged at narrower intervals than the contact parts located corresponding to the central region.

8. The secondary battery assembly according to claim 1, wherein the contact parts include a contact part protruding in a columnar shape.

9. The secondary battery assembly according to claim 8, wherein a contact area of each contact part to the pressed surface is larger in a position corresponding to the one-side regions than in a position corresponding to the central region.

10. The secondary battery assembly according to claim 8, wherein the contact parts located corresponding to the one-side regions are arranged at narrower intervals than the contact parts located corresponding to the central region.

11. The secondary battery assembly according to claim 1, wherein an area occupying ratio of the contact parts is higher in the position corresponding to the one-side regions than in the position corresponding to the central region.

* * * * *